(12) United States Patent
Desai

(10) Patent No.: US 7,182,397 B1
(45) Date of Patent: Feb. 27, 2007

(54) AUTOMOTIVE COWL COVER

(75) Inventor: Vinod Desai, Royal Oak, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 0 days.

(21) Appl. No.: 11/332,453

(22) Filed: Jan. 13, 2006

(51) Int. Cl.
*B62D 25/08* (2006.01)
*B60J 1/02* (2006.01)

(52) U.S. Cl. ............... 296/192; 296/96.21; 296/201

(58) Field of Classification Search ............ 296/192, 296/146.15, 84.1, 96.21, 201
See application file for complete search history.

(56) References Cited

U.S. PATENT DOCUMENTS

| | | | | |
|---|---|---|---|---|
| 4,679,845 A | | 7/1987 | Detampel et al. | |
| 4,750,780 A | * | 6/1988 | Harasaki et al. | 296/192 |
| 4,874,198 A | * | 10/1989 | Roller | 296/192 |
| 5,013,077 A | * | 5/1991 | Stevens | 296/96.21 |
| 5,352,010 A | * | 10/1994 | Brodie et al. | 296/192 |
| 2005/0179285 A1 | * | 8/2005 | Nakajima et al. | 296/192 |

* cited by examiner

*Primary Examiner*—Jason Morrow
(74) *Attorney, Agent, or Firm*—Young Basile

(57) ABSTRACT

An automotive cowl cover includes a first wall and a second wall disposed from the first wall, the first and second walls defining opposing sides of a channel configured for receiving an edge of a windshield, and a tapered shim having a non-uniform height extending from the first wall toward the second wall. The defined channel can engage an edge of the windshield of the automobile.

26 Claims, 5 Drawing Sheets

US 7,182,397 B1

AUTOMOTIVE COWL COVER

FIELD OF THE INVENTION

The present invention relates in general to an automotive cowl cover, and more particularly, to a device for securing the cowl cover to an edge of a windshield of an automotive vehicle.

BACKGROUND

Conventional automotive vehicles include a cowl cover that attaches to a bottom edge of a windshield of the vehicle. The cowl cover is typically made from molded plastic and may have a unitary construction or may consist of multiple connectable sections depending on the requirements of a particular application. The cowl cover may be attached to the windshield of the vehicle using clips mounted to a bottom surface of the cowl cover. The cowl cover is held against an outside surface of the windshield by engaging the clips with corresponding protrusions extending from an upper dash region of the vehicle. This method of attachment, however, may not produce a consistently tight gap-free connection between the cowl cover and the windshield due to various manufacturing tolerances of the involved parts. Furthermore, differences in the coefficient of thermal expansion between parts, such as the windshield and cowl cover, may cause the cowl cover to warp under certain conditions, possibly causing a gap to occur between the windshield and the cowl cover.

Another method for attaching the cowl cover to the windshield involves engaging a lower edge of the windshield with a series of clips molded into an aft edge of the cowl cover. The resulting fit between the cowl cover and the windshield is often dependant on the positioning and relative spacing of the clips. Improper spacing may produce an unsatisfactory fit between the cowl cover and the windshield that is not very aesthetically pleasing, but may also allow water to pass between the cowl cover and the windshield. Using this attachment method may also lead to undesirable vibration noise occurring between the windshield and cowl cover when operating the vehicle.

Because of these and other known limitations of existing methods for connecting a cowl cover to a windshield of an automotive vehicle, it is desirable to develop a connecting device for producing a tight fit between the cowl cover and an outer surface of the windshield.

SUMMARY

An automotive cowl cover is provided including a first wall and a second wall disposed from the first wall, the first and second walls defining opposing sides of a channel configured for receiving an edge of a windshield, and at least two tapered shims, each having a non-uniform height extending from the first wall toward the second wall. The defined channel can engage an edge of the windshield of the automobile.

BRIEF DESCRIPTION OF THE DRAWINGS

The automotive cowl cover disclosed herein will become more fully understood from the detailed description and accompanying drawings, wherein.

DETAILED DESCRIPTION

The following description of the embodiments is merely exemplary in nature and is in no way intended to limit the invention, its application, or uses.

Figure 1:
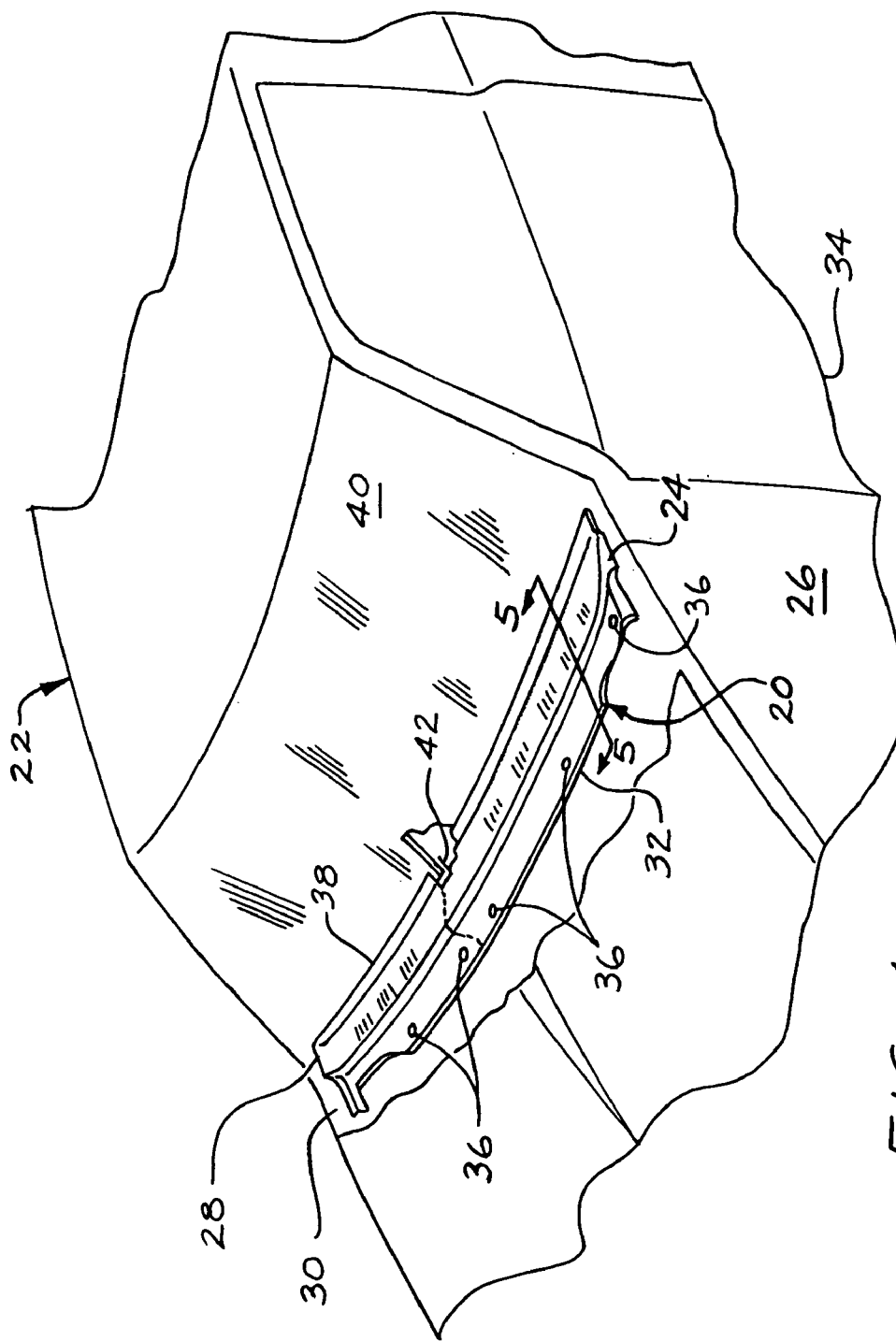
FIG. 1 is a fragmentary front perspective view showing an embodiment of the automotive cowl cover disclosed herein attached to an automotive vehicle, a section of a windshield of the vehicle having been removed for clarity to illustrate the connection between the cowl cover and the windshield.
Figure 5:
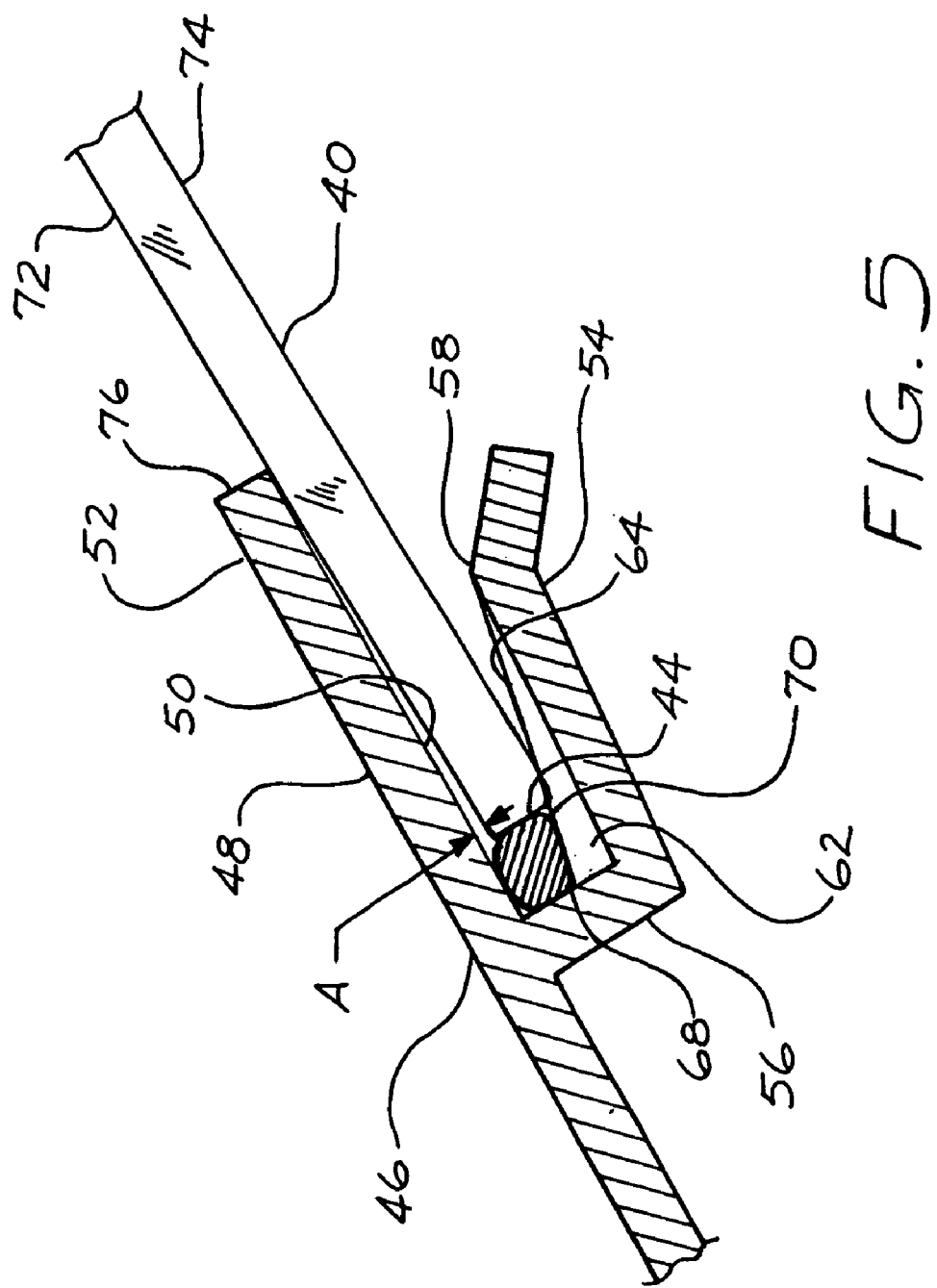
FIG. 5 is a cross-sectional view of the cowl cover and windshield taken along section line 5—5 of FIG. 1, showing the windshield engaged with the channel.

Referring to FIGS. 1 and 5, an embodiment of a cowl cover 20 employed in an automotive vehicle 22 is positioned generally horizontally across a width of the vehicle, such that a left end 24 of cowl cover 20 is positioned adjacent a left fender 26 of the vehicle, and a right end 28 of cowl 20 is positioned adjacent a right fender 30 of the vehicle. Cowl cover 20 may be attached to a body 34 of vehicle 22 using screws 36. An aft edge 38 of cowl cover 20 engages a lower edge 44 of a windshield 40. Cowl cover 20 is preferably long enough to extend along the entire lower edge of windshield 40.

Cowl cover 20 may be formed as a single unitary part, or may consist of two or more adjoining sections, depending on the requirement of a particular application. For example, the cowl cover may consist of separate right and left hand members having an interfitting tongue and groove interface for engaging the two members, which will allow for relative lateral movement between the two members when attached to the vehicle body. Cowl cover 20 may be formed from any of a variety of know materials, but preferably from an elastic material, such as plastic. It is also desirable that the elastic material exhibit resistance to environmental effects, such as sunlight, rain, snow, extreme temperature changes, road salt, as well as others, that may otherwise adversely impact the material's physical properties.

When attached to vehicle 22, cowl cover 20 defines an upper region of a cavity for enclosing and concealing from view various automotive components, such as a windshield wiper motor, a washer pump, supply duct openings, and the like. These components, as well as other components, such as windshield wiper arms and washer spray nozzles, may also be mounted directly to the cowl cover. Cowl cover 20 also provides an aesthetically pleasing transition between windshield 26 and body 34 of vehicle 22.

Figure 2:
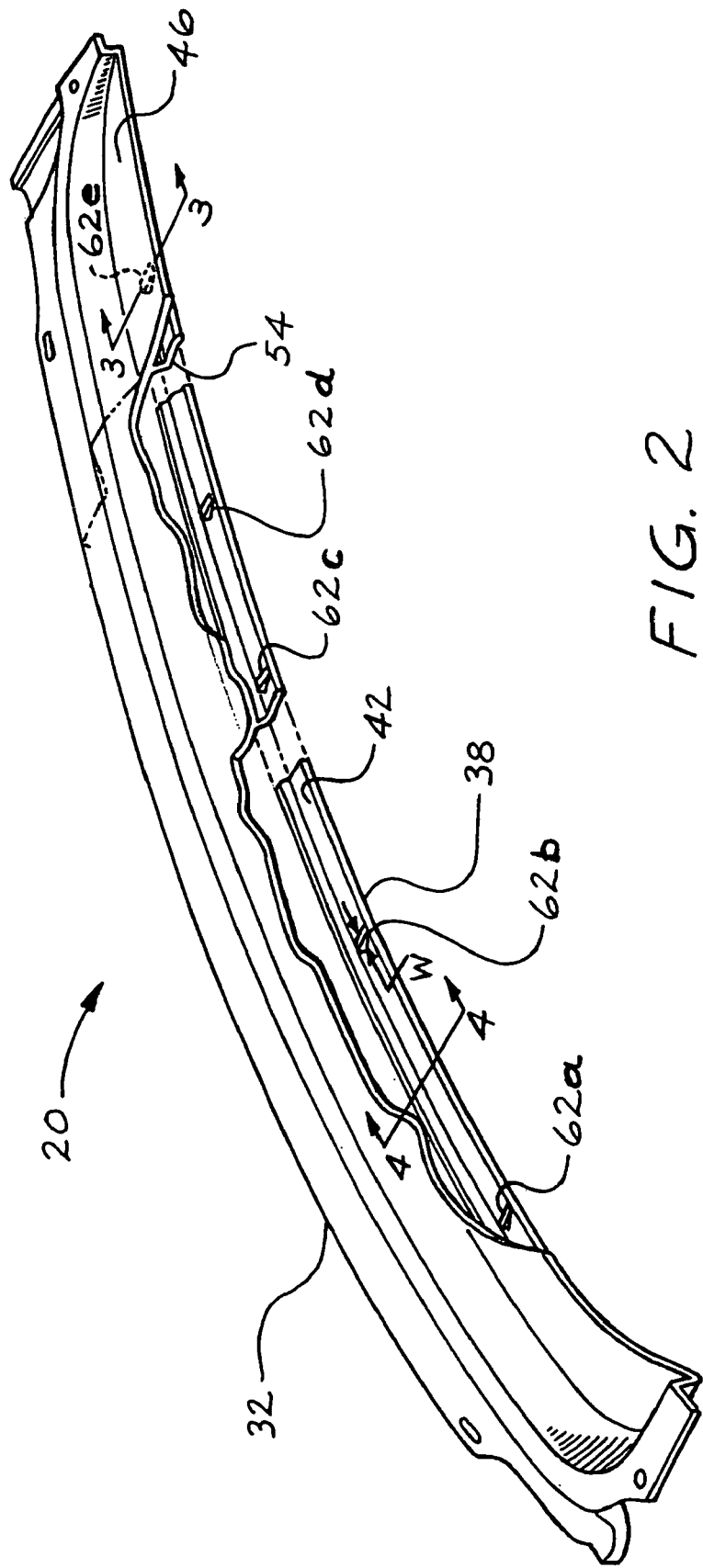
FIG. 2 is rear perspective view of the cowl cover with a portion of a top wall of the cowl cover removed to illustrate a channel for attaching the cowl cover to a lower edge of the windshield.
Figure 4A:
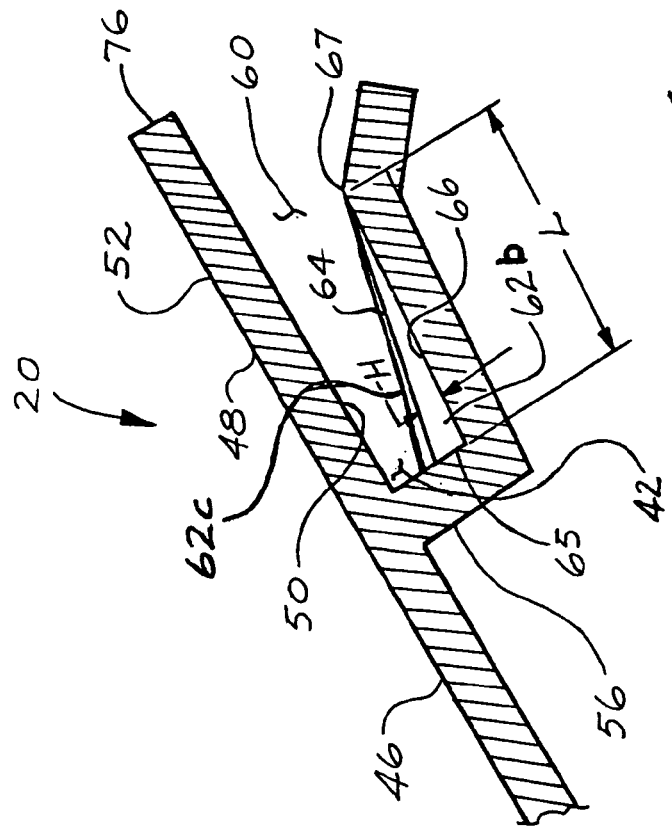
FIG. 4a is a cross-sectional view of the cowl cover taken along section line 4—4 of FIG. 2, showing the cowl cover at a location that does not include a tapered shim.
Figure 3:
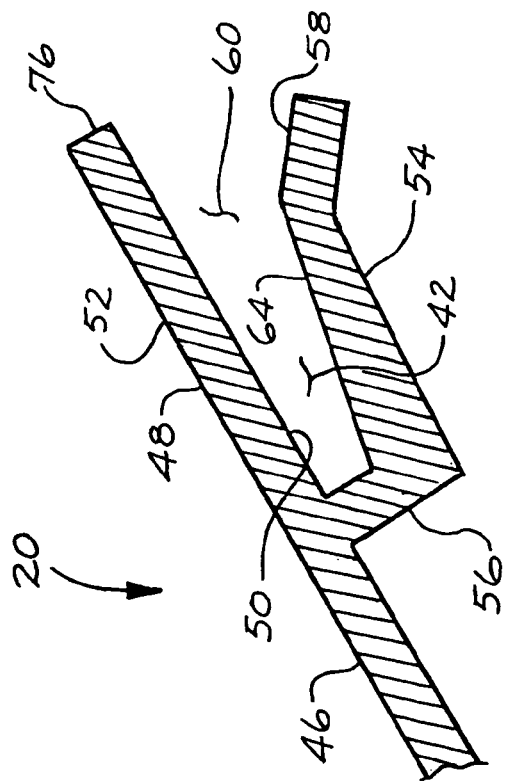
FIG. 3 is a cross-sectional view of the cowl cover taken along section line 3—3 of FIG. 2, showing the cowl cover at a location that includes a tapered shim.

Referring also to FIGS. 2–4, extending along aft edge 38 of cowl cover 20 is a U-shaped channel 42 for receiving the lower edge 44 of windshield 40. Channel 42 may consist of a single uninterrupted channel extending along the entire aft edge 38 of windshield 40, or may consist of a series of discrete channels arranged end-to-end. Channel 42 engages at least a portion of lower edge 44 of windshield 40 when cowl cover 20 and windshield 40 are attached to vehicle 22.

Figure 4C:
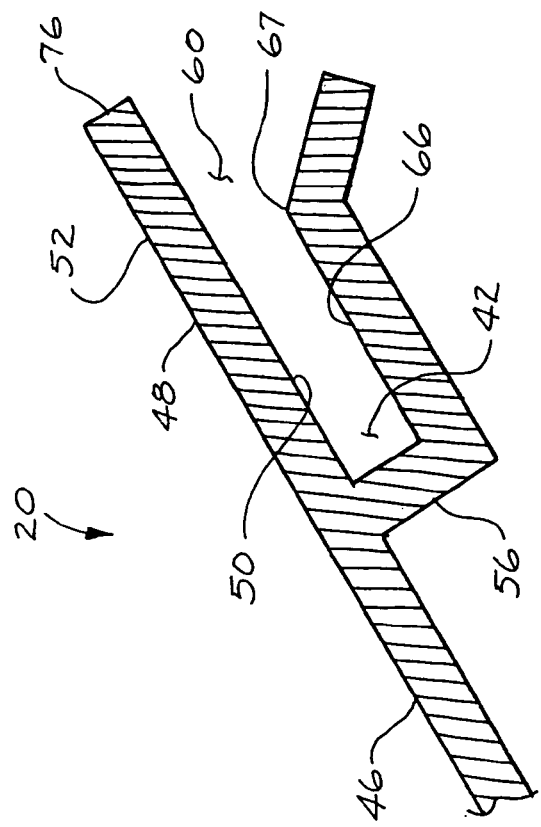
FIG. 4c is a cross-sectional view of the cowl cover taken along section line 4—4 of FIG. 2 in accordance with an alternative embodiment.
Figure 4B:
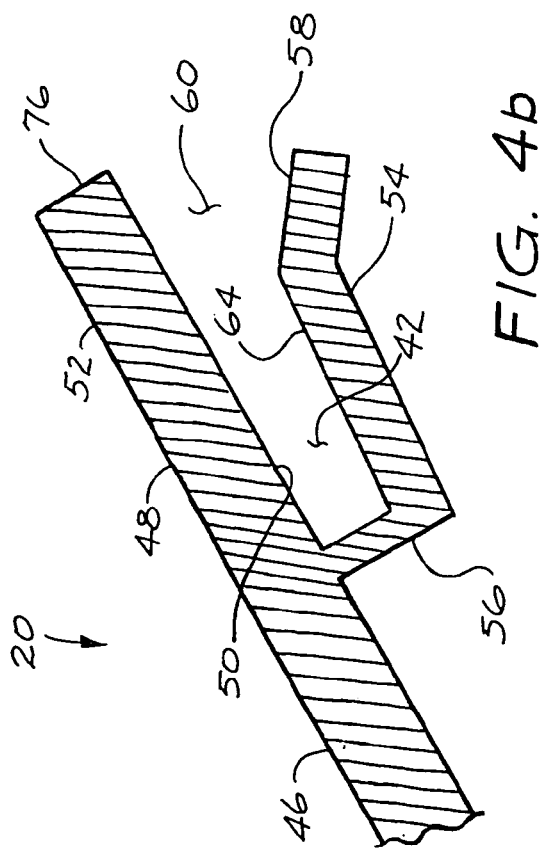
FIG. 4b is a cross-sectional view of the cowl cover taken along section line 4—4 of FIG. 2, in accordance with an alternative embodiment.

Cowl cover 20 includes an outer wall 46 having an outside surface 48 viewable from outside vehicle 22, and an opposite inside surface 50 that is concealed from view. A free end 52 of outer wall 46 forms one leg of U-shaped channel 42. Channel 42 also consists of an inner wall 54 separated from inside surface 50 of outer wall 46. Outer wall 46 and inner wall 54 define opposing sides of channel 42. Outer wall 46 and inner wall 54 are connected together by means of a bottom wall 56 extending between inside surface 50 of outer wall 46 and inner wall 54. Bottom wall 56 defines a bottom surface of U-shaped channel 42. Outer wall 46 may have a thickness greater than inner wall 54, which in turn may have a thickness greater than bottom wall 56, as shown in FIG. 4b.

Free end 52 of outer wall 46 and a free end 58 of inner wall 54 define an open end 60 of channel 42 opposite bottom wall 56. Free end 58 of inner wall 54 may flare away from outer wall 46 to assist engaging windshield 40 with channel 42 during assembly. Inside wall 54 extends substantially parallel to outside wall 46 in the longitudinal direction and is inclined relative to outside wall 46 in the transverse direction, such that the distance between outer wall 46 and inner wall 54 measured across channel opening 60 is greater than the distance between the two walls measured across the bottom of the channel. Alternatively, inner wall 54 may be aligned parallel with outer wall 46 in the transverse direction, as shown in FIG. 4c.

Disposed within channel 42 are one or more discrete tapered shims 62a–62e (referred to generally herein as shims 62). Tapered shims 62 extend from inner wall 54 toward inner surface 50 of outer wall 46. As shown in FIGS. 2 and 4, each shim 62 has a length "L" extending in a generally transverse direction across the channel from opening 60 to bottom wall 56. Each shim 62 also has a width "W" extending longitudinally along a length of the channel. Finally, a height "H" of each shim 62 is defined as the distance from an inside surface 66 of inside wall 54 to an exposed upper edge 64 of shim 62, measured perpendicular to surface 66.

Each shim 62 preferably has a non-uniform height, with each shim 62 being tapered lengthwise, such that the distance from exposed upper edge 64 of shim 62 to an inside surface 66 of inside wall 54 progressively increases, at least over a portion of each shim 62, from channel opening 60 to bottom wall 56. Conversely, the distance between upper edge 64 of shim 62 and inside surface 50 of outer wall 46 may progressively decrease from channel opening 60 to bottom wall 56. The distance between upper edge 64 of a shim 62 and inside surface 50 of outer wall 46 is, at some point along the length of shim 62, less than a thickness of lower edge 44 of windshield 40. Each individual shim 62 may have a rate of taper and a maximum height that differs from any one or more of the remaining shims, such as, for example, shown in FIG. 4c, where the maximum height and rate of taper of shim 62b differs from the maximum height and rate of taper of shim 62c. The rate of taper and maximum shim height may vary depending on the requirements of a particular application. Preferably, tapered shims 62 are integrally formed with inner wall 54, but may alternatively be attached to inner wall 54 by gluing, screws, rivets, welding, or any other suitable attachment method.

Although tapered shim 62 is shown engaging bottom wall 56, it shall be appreciated that tapered shim 62 may also be configured so as to have a trailing end 65 of tapered shim 62 displaced from bottom wall 56, thus separating tapered shim 62 from bottom wall 56. It shall also be appreciated that it is not necessary that a leading end 67 of tapered shim 62 engage inside wall 54 at the transition point between flared free end 58 of inner wall 54 and the remaining portion of the inner wall, but may also engage inner wall 54 at a location forward or aft of the transition point.

Also disposed within channel 42 is an elongated spacer 68 for providing cushioning between bottom wall 56 and edge 44 of windshield 40 when the two are assembled together, as depicted in FIG. 5. Spacer 68 engages bottom wall 56 and edge 44 of windshield 40 when the windshield is fully seated within channel 42. A single spacer 68 may be disposed within channel 42, or if desired, multiple discrete spacers 68 may be positioned at selected locations along the length of the channel. Spacer 68 is preferably made from a resilient material impervious to water, salt, dirt, as well as other contaminants. Although shown to have a generally square cross-sectional shape, it shall be appreciated that other shapes, such as round and hexagonal, may also provide satisfactory performance.

Windshield 40 may be assembled to cowl cover 20 by inserting edge 44 of windshield 40 into open end 60 of channel 42. Inserting windshield 40 progressively further into channel 42 results in an inside corner edge 70 of windshield 40 contacting upper surface 64 of tapered shim 62, as well as an outside surface 72 of windshield 40 contacting inner surface 50 of cowl outer wall 46. Increasing the engagement between the windshield and the channel beyond the point of initial contact causes inner wall 54 to elastically deflect away from outer wall 46. This creates a biasing force against an inside surface 74 of windshield 40 that tends to pull free end 52 of outer wall 46 tight against outer surface 72 of windshield 40. The amount of biasing force can be controlled by adjusting the height and slope rate of tapered shim 62. It is preferable that outer wall 46 be angle slightly away from windshield 40 to help insure that a distal end 76 of outer wall 46 contacts outer surface 72 of windshield 40. This may cause a gap "A" to occur between inside surface 50 of outer wall 46 and outer surface 72 of windshield 40 along lower edge 44 of the windshield, which is perfectly acceptable.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A cowl cover comprising:
   a first wall;
   a second wall displaced away from the first wall, the first and second walls defining opposing sides of a channel for receiving an edge of a windshield; and
   at least two tapered shims spaced apart along a longitudinal length of the channel, each having a non-uniform height extending from the second wall toward the first wall, wherein the first wall is engageable with a first surface of the windshield and each tapered shim is engageable with a second surface of the windshield opposite the first surface of the windshield.

2. The cowl cover of claim 1 further comprising a third wall extending between the first and second walls for defining a bottom of the channel.

3. The cowl cover of claim 2, wherein the channel comprises an open end opposite the bottom of the channel defined by a free end of the first wall and a free end of the second wall, the distance between the first and second walls at the open end of the channel is greater than the distance between the first and second walls at the bottom of the channel, both distances being measured perpendicular to the first wall.

4. The cowl cover of claim 2, wherein the channel comprises an open end opposite the bottom of the channel, the open end being defined by a free end of the first wall and a free end of the second wall, the first wall being uniformly spaced from the second wall from the opening of the channel to the bottom of the channel.

5. The cowl cover of claim 2, wherein a thickness of the second wall is greater than a thickness of the third wall.

6. The cowl cover of claim 2, wherein the first wall is uniformly displaced from the second wall.

7. The cowl cover of claim 1, wherein one of the at least two spaced apart tapered shims has a maximum height greater than a maximum height of at least one of the remaining tapered shims.

8. The cowl cover of claim 1, wherein the tapered shim includes an upper edge displaced away from the second wall and separated from the first wall.

9. The cowl cover of claim 8, wherein at least a portion of the upper edge is separated from the first wall by distance less than the thickness of the edge of the windshield.

10. The cowl cover of claim 1, wherein a thickness of the first wall is greater than a thickness of the second wall.

11. The cowl cover of claim 1, wherein the second wall asserts a biasing force against the second surface of the windshield for maintaining contact between the first wall and the first surface of the windshield.

12. The cowl cover of claim 1, wherein the second wall is constructed from a elastic material for enabling the second wall to deflect away from the first wall when the edge of the windshield is operably engaged with the channel.

13. The cowl cover of claim 2 further comprising a resilient elongated spacer disposed within the channel, the spacer simultaneously engageable with the third wall and the edge of the windshield when the windshield is fully engaged with the channel.

14. An automotive vehicle comprising:
a body;
a windshield attached to the body, the windshield having an inner surface facing an interior of the vehicle and an opposing outer surface;
a cowl cover attached to the body, the cowl cover having a channel engaging an edge of the windshield, the channel including a first wall, a second wall displaced away from the first wall, and at least two tapered shims extending from the second wall toward the first wall, each shim being displaced from an adjacent shim along a longitudinal length of the channel, at least one of the at least two tapered shims having a different maximum height than at least one of the remaining shims, wherein the first wall engages the outer surface of the windshield and the tapered shim engages the interior surface of the windshield.

15. The automotive vehicle of claim 14 further comprising a third wall extending between the first wall and the second wall, the third wall defining a bottom of the channel.

16. The automotive vehicle of claim 15 further comprising a resilient spacer disposed in the channel, the spacer engaging the third wall and the edge of the windshield.

17. The automotive vehicle of claim 15, wherein the channel comprises an open end opposite the bottom of the channel, the open end being defined by a free end of the first wall and a free end of the second wall, the height of the tapered shim progressively increasing from the open end to the bottom of the channel.

18. The automotive vehicle of claim 14, wherein the entire second wall is spaced away from the inner surface of the windshield.

19. The automotive vehicle of claim 14, wherein engagement of the windshield with the channel causes the second wall to be elastically displaced away from the first wall, thereby producing a biasing force for urging the first wall into contact with the outer surface of the windshield.

20. The automotive vehicle of claim 14, wherein the second wall is transversely inclined relative to the first wall.

21. The automotive vehicle of claim 14, wherein the second wall is aligned substantially parallel along a transverse direction relative to the first wall.

22. The automotive vehicle of claim 14, wherein the tapered shim includes and exposed edge inclined relative to both the first and second walls.

23. The automotive vehicle of claim 22, wherein only a portion of the tapered shim contacts the inner surface of the windshield.

24. A cowl cover comprising:
a first wall;
a second wall displaced away from the first wall, the first and second walls defining opposing sides of a channel for receiving an edge of a windshield;
at least two tapered shims spaced apart along a longitudinal length of the channel, each having a non-uniform height extending from the second wall toward the first wall, wherein the first wall is engageable with a first surface of the windshield and each tapered shim is engageable with a second surface of the windshield opposite the first surface of the windshield; and
a third wall extending between the first and second walls for defining a bottom of the channel;
wherein the channel comprises an open end opposite the bottom of the channel, the open end being defined by a free end of the first wall and a free end of the second wall, the free end of the second wall is flared away from the first wall.

25. The cowl cover of claim 24, wherein one of the at least two spaced apart tapered shims has a maximum height greater than a maximum height of at least one of the remaining tapered shims.

26. The cowl cover of claim 24 further comprising a resilient spacer disposed in the channel, the spacer engaging the third wall and the edge of the windshield.

* * * * *